Patented June 15, 1948

2,443,391

UNITED STATES PATENT OFFICE 2,443,391

METHIONINE ISOLATION PROCESS

Edward C. Kirkpatrick, Wilmington, Del., assignor to E. I. du Pont de Nemours & Company, Wilmington, Del., a corporation of Delaware No Drawing. Application September 26, 1945, Serial No. 618,781

7 Claims. (Cl. 260—534)

This invention relates to the synthesis of methionine and more particularly to improvements in the separation of methionine from the hydrolysis products of alpha-amino-gamma-methylmercaptobutyronitrile.

In the copending application of W. F. Gresham and C. E. Schweitzer, S. N. 522,966, filed February 18, 1944, which has become abandoned, an improved synthesis of methionine is disclosed in which acrolein is reacted with methyl mercaptan in the presence of charcoal or an amine catalyst and the resulting product is treated with HCN to form beta-methylmercaptopropionaldehyde cyanhydrin. The latter compound is then subjected to amination by means of high pressure ammonia and the resulting alpha-amino-gamma-methylmercaptobutyronitrile (hereinafter called methionine nitrile) is hydrolyzed with sulfuric acid to give a reaction product which, upon neutralization with aqueous ammonia or other like alkaline agent, gives a solution containing methionine. This solution also contains ammonium sulfate and/or bisulfate (produced by hydrolysis of the nitrile), as well as certain by-products which have a tendency to increase the solubility of methionine in the mixture, and which give rise to tarry impurities. The presence of these by-products renders the separation of pure methionine in high yield extremely difficult and troublesome. These difficulties are aggravated by the fact that the tarry bodies formed from the by-products interfere with filtrations, crystallizations, and other similar essential operations in the purification process.

Heretofore, various methods have been employed for separating amino acids from aqueous solutions containing ammonium sulfate or ammonium bisulfate and an amino acid. One such method, disclosed in U. S. Patent 2,071,282, is to add ammonia (in gaseous form or in the form of an aqueous solution), which causes precipitation of the ammonium sulfate, thus producing a solution from which the amino acid can be crystallized by vaporing the solvent. Attempts have also been made to salt out amino acids by the use of certain soluble inorganic salts, but, in general, these methods have not been successful because soluble inorganic salts, almost without exception, have been found to increase rather than to decrease solubility of amino acids in water. It has been found that none of these methods is satisfactory for the separation of methionine from the crude hydrolysis products of methionine nitrile, for reasons set forth above.

An object of this invention is to provide an improved process for the separation of methionine from the hydrolysis products of methionine nitrile. A further object is to provide a method for separating pure methionine from the by-products formed during the hyrolysis of methionine nitrile. Other objects of the invention appear hereinafter.

These and other objects are accomplished in accordance with the invention by adding ammonium sulfate to aqueous solutions of methionine, and more particularly to the hydrolysis products of methionine nitrile, thus causing a coagulation of certain impurities which may be present, and thereafter separating methionine from the resulting mixture.

In a specific embodiment, the invention may be practiced by introducing ammonium sulfate into the aqueous hydrolysis products of methionine nitrile (which already contain a certain amount of ammonium sulfate, produced by the hydrolysis or neutralization reactions), whereby coagulation of tarry bodies occurs and the solubility of methionine in the mixture is reduced. A precipitate containing methionine, coagulated tarry material and ammonium sulfate is thus obtained. Methionine may be isolated from this precipitate by various methods, such as by extraction with an inert solvent, as described below.

This invention involves the discovery that the addition of ammonium sulfate causes a decrease in the solubility of methionine in the hydrolysis product, especially at a pH of about 5 to 6. The ammonium sulfate has this unexpected effect by reason of the fact that it causes coagulation of by-products which, prior to coagulation, tend to increase the solubility of the methionine. Moreover, ammonium sulfate exerts a slight, but useful, salting out effect on methionine, even in the absence of the aforesaid by-products.

The invention may be practiced merely by adding ammonium sulfate to aqueous solutions containing more than about 2.6% by weight of methionine, at a pH of about 5 to 6, whereupon the methionine precipitates. Other embodiments of the invention involve subjecting a solid mixture of crude methionine and ammonium sulfate (e. g., a mixture of the solids, or a moist filler cake, containing methionine admixed with the coagulated tarry bodies and ammonium sulfate) to the action of a substantially saturated aqueous solution of methionine, whereby the amount of methionine in the said solid mixture increases while the solid ammonium sulfate is removed therefrom by solution in the aqueous phase.

The invention is illustrated further by means of the following examples.

*Example 1.*—The hydrolysis product obtained by heating methionine nitrile at about boiling temperature for 2 hours with aqueous sulfuric acid (concentration, 50%), after neutralization with 28% aqueous ammonia to a pH of 5 to 6, yields an aqueous mixture containing ammonium sulfate and about 15 per cent by weight of methionine, based on the overall weight. This mixture is cooled to 30° C., and ammonium sulfate is added to the point of saturation. This produces a precipitate containing methionine, coagulated tarry material, and ammonium sulfate. This precipitate of crude methionine is removed by filtration, and the filter cake is washed with a substantially saturated aqueous solution of methionine (the mother liquor obtained in a prior methionine recrystallization from water). The filtrate is evaporated for recovery of crude ammonium sulfate, which is in a form suitable for use as a fertilizer. The washing of the filter cake causes a leaching out of the ammonium sulfate therefrom, and an increase in the quantity of solid methionine therein. The washed filter cake is dissolved in a minimum quantity of hot water, whereupon the coagulated tarry product separates as a layer. This is skimmed off, after which the resulting solution of methionine is decolorized with charcoal, filtered, and cooled, yielding crystals of pure methionine. The pure methionine is removed by filtration and the mother liquor is set aside for use in washing a subsequent batch of the precipitated crude methionine containing ammonium sulfate and tarry bodies.

*Example 2.*—A saturated solution of methionine in water at 30° C., is found to contain 3% by weight of methionine. A quantity of ammonium sulfate corresponding to 66% by weight of the amount of water in the saturated solution of methionine at 30° C. is introduced into the solution. About 13% of the methionine present is salted out by ammonium sulfate. Repetition of the experiment with ammonium chloride in place of ammonium sulfate does not cause salting out of methionine.

The examples set forth above are illustrative only, and various modifications may be made if desired. Thus, in the neutralization step, alkaline materials other than ammonia may be employed to neutralize the acidic constituents in the hydrolysis mixture. The neutralization may be carried somewhat beyond the pH range of 5 to 6 if desired, but this results in an undesirable increase in methionine solubility, since the isoelectric point of methionine is about 5. Excessive quantities of alkali are therefore disadvantageous.

If desired, the addition to the hydrolysis mixture of at least a part of the total amount of ammonium sulfate required may be made simultaneously with the addition of the neutralizing agent, i. e. the crude hydrolyzate may be treated with an aqueous solution of ammonia and ammonium sulfate, so as to neutralize the mixture while precipitating the crude methionine. There is, in fact, an advantage in so doing, because, after removal of the precipitated crude methionine by filtration, the ammonium sulfate-containing filtrate may be treated with ammonia to precipitate ammonium sulfate therefrom, leaving a supernatant liquor, containing ammonia and ammonium sulfate which is suitable for use in neutralizing the crude hydrolyzate.

If desired, the washings from crude methionine filter cake (cf. Example 1) may be utilized by evaporating at least a part of the water therefrom and admixing the residue with crude aqueous hydrolyzate, preferably before neutralization thereof. Numerous other modifications of the method illustrated in the examples will readily occur to those who are skilled in the art.

The chief advantages of the herein disclosed method for separating methionine from the hydrolysis products of methionine nitrile are: (1) the ease of removal of the tarry by-product, and (2) the fact that the handling losses are low. Moreover, the sulfuric acid is recovered in the form of saleable ammonium sulfate.

An unexpected benefit is the effect of the ammonium sulfate on the tar-producing by-products of the hydrolysis reaction. These by-products cover a range of compositions from water-soluble or emulsified oils to viscous tars. Their removal by conventional methods is difficult and results in large losses of methionine. As a result of the ammonium sulfate treatment, the tars become largely adsorbed on the crude methionine precipitate, and when the methionine cake is redissolved in water for recrystallization roughly 95% of the tar separates as an oily phase which may be removed by decantation, skimming, centrifuging, etc. The remaining tar is of a type which can be efficiently removed by active carbon. The separation of the tar effects a large saving of methionine and reduces the load on the subsequent methionine purification operations.

Since many different embodiments of the invention may be made without departing from the spirit and scope thereof, it will be understood that I do not limit myself except as set forth in the following claims.

I claim:

1. In a process for the preparation of methionine, the steps which comprise hydrolyzing methionine nitrile by reaction with hot dilute sulfuric acid, neutralizing the reaction product to a pH of 5 to 6 by addition of ammonia, adding ammonium sulfate directly to the neutralization mixture, whereby a precipitate containing methionine, coagulated tarry material, and ammonium sulfate is formed, and thereafter separating methionine from the said precipitate.

2. In a process for the preparation of methionine, the steps which comprise hydrolyzing methionine nitrile by reaction with hot dilute aqueous sulfuric acid, neutralizing the reaction product to a pH of 5 to 6 by addition of ammonia, adding ammonium sulfate directly to the said neutralized product whereby a precipitate containing methionine is formed, washing the said precipitate with a substantially saturated aqueous solution of methionine, admixing the resultant washed precipitate with water whereby the methionine goes into solution and a separate layer of tarry product is formed, removing the said tarry products from the resultant aqueous mixture, and thereafter separating methionine from the remaining aqueous solution.

3. In a process for the preparation of methionine, the steps which comprise hydrolyzing methionine nitrile by reaction with hot dilute aqueous sulfuric acid, neutralizing the resultant reaction product to a pH of 5 to 6 by addition of ammonia, adding ammonium sulfate directly to the neutralization mixture, separating therefrom the resultant precipitate containing methionine admixed with coagulated tarry bodies, dissolving the said methionine in water, and thereafter purifying the said methionine by recrystallization from water.

4. In a process for the synthesis of methionine the steps which comprise heating methionine nitrile with aqueous sulfuric acid, neutralizing the resultant hydrolysis product with ammonia to a pH of about 5 to 6, cooling the resultant mixture to about 30° C., adding ammonium sulfate directly to the cooled mixture whereby crude methionine is precipitated, and separating the resultant precipitated crude methionine therefrom.

5. In a process for the synthesis of methionine, the steps which comprise heating methionine nitrile with aqueous sulfuric acid of about 50% concentration at about the boiling point, neutralizing the resultant hydrolysis product with ammonia to a pH of about 5 to 6, cooling the resulting mixture to about 30° C., adding ammonium sulfate directly to the cooled mixture whereby a precipitate containing methionine is formed, and separating the resultant precipitated methionine therefrom.

6. In a process for the synthesis of methionine, the steps which comprise hydrolyzing methionine nitrile by reaction with hot aqueous sulfuric acid, neutralizing the hydrolysis product to a pH of about 5 to 6 by adding ammonia thereto, precipitating crude methionine therefrom by addition of ammonium sulfate directly to the resulting mixture, removing the resultant precipitate of crude methionine by filtration, washing the said crude methionine with a substantially saturated aqueous solution of methionine, whereby the weight of solid methionine in the mixture increases, and purifying the said methionine by recrystallization from an inert solvent.

7. In a process for the preparation of methionine, the step which comprises saturating with ammonium sulfate an aqueous solution containing initially more than 2.6% by weight of methionine, said solution being obtained by hydrolysis of methionine nitrile by reaction with hot, dilute, aqueous sulfuric acid, the pH of the said solution being adjusted to about 5 to 6 by the addition of ammonia, whereby a precipitate of methionine is formed.

EDWARD C. KIRKPATRICK.

REFERENCES CITED

The following references are of record in the file of this patent:

UNITED STATES PATENTS

| Number | Name | Date |
|---|---|---|
| 2,004,523 | Fick | June 11, 1935 |
| 2,071,282 | Gluud, et al. | Feb. 16, 1937 |

FOREIGN PATENTS

| Number | Country | Date |
|---|---|---|
| 647,989 | Germany | July 19, 1937 |
| 654,025 | Germany | Dec. 16, 1937 |